United States Patent [19]
Malik

[11] 3,874,051
[45] Apr. 1, 1975

[54] METHOD FOR PRODUCING GIRDERS

[76] Inventor: Stanislaus Malik, Taelesbahnstrasse 24, 734 Geislingen, Germany

[22] Filed: Jan. 25, 1974

[21] Appl. No.: 436,725

[30] Foreign Application Priority Data
Jan. 25, 1973   Germany............................ 2303466

[52] U.S. Cl................... 29/155 R, 29/416, 29/463
[51] Int. Cl...................... B23p 17/00, B21d 39/02
[58] Field of Search....... 29/155 R, 155 C, 463, 416

[56] References Cited
UNITED STATES PATENTS

| | | | |
|---|---|---|---|
| 1,644,940 | 10/1927 | Moyer | 29/155 R |
| 3,050,831 | 8/1962 | Diamond | 29/155 R |

*Primary Examiner*—Thomas H. Eager
*Attorney, Agent, or Firm*—Richard L. Schwaab

[57] ABSTRACT

Disclosed is an open-web girder and a method for producing same, according to which two bands of stock material having an undulating pattern along one edge thereof are formed from flat, continuous lengths of material, preferably by making a single undulating cut in one piece of material, the thus-cut bands of material are joined together, e.g., by welding, riveting or the like, such that they are joined at the high points of the undulations and the low points of each band cooperate to form openings in the resultant planar web, and finally, the planar web is formed into a profile of a structural girder, for example, by cold rolling.

7 Claims, 5 Drawing Figures

PATENTED APR 1 1975  3,874,051

1

METHOD FOR PRODUCING GIRDERS

BACKGROUND OF THE INVENTION

The present invention relates to the production of girders, and more especially to the production of open-web girders.

It is known in the prior art to produce such an open-web girder from two separate pieces which may be prepared independently by cutting two separate pre-rolled girder structures such that they have a saw tooth or undulating pattern along one edge, or alternatively by cutting a single pre-rolled girder along a single undulating cut-line to divide same into two pieces having the appropriate configuration, positioning the two parts in such a manner that openings are formed therethrough and then joining the two parts together. A process of this type is disclosed in German Offenlegunsschrift No. 1,484,301 as well as in Beratungsstelle fuer Stahlverwendung, Merkblatt No. 361, "Wabentraeger," 2nd Edition, 1971.

The known methods employ as starting materials already finished girders which have been given the desired profile. Therefore, girders having a double T profile (i.e., I-profile) are cut at the center along a saw tooth or undulating line into two parts, the two parts are displaced with respect to one another in such a manner that openings are produced therebetween, preferably hexagon-shaped openings or alternatively octagon-shaped openings, and are thus joined together.

The disadvantage of this type of process resides in the fact that it is limited both in the selection of the profile itself as well as in the determinastion of the web or girder height which can be modified only to a minor degree by variation of the path along which the girder is cut, to those pre-determined profiles which are available in commerce. To the extent that structural deviations of these pre-determined profiles are desired, it is possible only to introduce additional plates corresponding to the change desired. See German Offenlegunsschrift No. 1,484,301.

SUMMARY OF THE INVENTION

It is an object of the present invention to obviate the disadvantages set forth above and provide a process which is not limited to the production of open-web girders having conventional profiles.

It is a further object of the present invention to provide a method of producing open-web girders which permits the selection of a dimension and profile of the girder according to any desired configuration.

It is also an object of the present invention to provide an improved open-web girder in accordance with the method of the present invention.

In accomplishing these and other objects, there is provided in accordance with the present invention a method for producing open-web girders which comprises joining first and second continuous bands of flat stock material having an undulating pattern along one edge thereof such that the high points of the first band join the corresponding high points of the second band and the low points of said first and second bands cooperate to form openings in the resulting planar web, and thereafter forming the planar web into any desired structural girder profile. In accordance with the method of the invention, the first and second bands of flat stock material having an undulating pattern may be formed either by cutting two separate continuous sheets of material or alternatively by making a single undulating cut in one sheet of stock material. Preferably, the undulating pattern is characterized by alternating peaks and valleys having a trapezoidal configuration. Joining of the two sections may be accomplished by either welding or riveting, and the web is finally profiled by cold rolling. When the two bands are formed by cutting a single sheet of material, it is convenient to merely displace one band with respect to the other by the amount necessary to align the two bands for joining together.

Other objects, features and advantages of the present invention will become apparent from the detailed description of the invention which follows, when considered together with the drawings.

DETAILED DESCRIPTION OF THE INVENTION

The essential difference between the present invention and the processes known in the prior art resides, first, in the fact that a flat open web having the appropriate openings therethrough is prepared in a continuous process from one or more flat bands of starting material, and then, after cutting the continuous length of open web into lengths corresponding to the girders to be produced, the web is formed into the desired profile. Accordingly, it is possible in accordance with this invention, by the appropriate choice of the width of the metal sheet serving as the starting material, to choose any desired height of the ultimate girder, even in a case where the undulating pattern for cutting the metal sheet is determined before hand. Furthermore, it is possible to completely eliminate the intermediate pieces necessary in accordance with the known methods for increasing the height of the girder. In addition, in the present invention one is not limited to the section modulus and moment of inertia of the finished profile proscribed with known material, and in contradistinction thereto, it is possible by corresponding selection of the subsequently rolled profile to achieve any desired arrangement of material of particular locations along the structure and/or to avoid such concentrations of material at places in the structure where not desired. Hence, it is possible to design these desired arrangements of material in the web region of the girder also in accordance with economic considerations. Such design modifications may also take place, for example, by rolling on in the continuous process different materials which are supplied together in the endless process, i.e., before the final forming of the girder into the desired profile.

Figure 1:
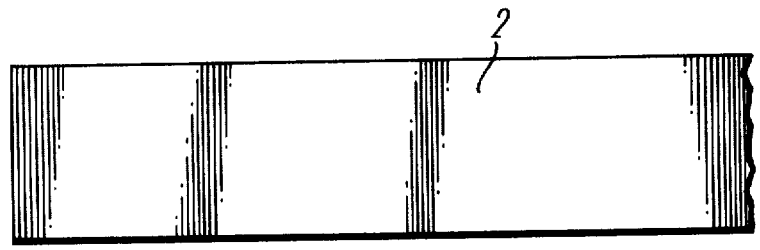
FIG. 1 is a top view of a flat, unworked, endless band of material.
Figure 2:
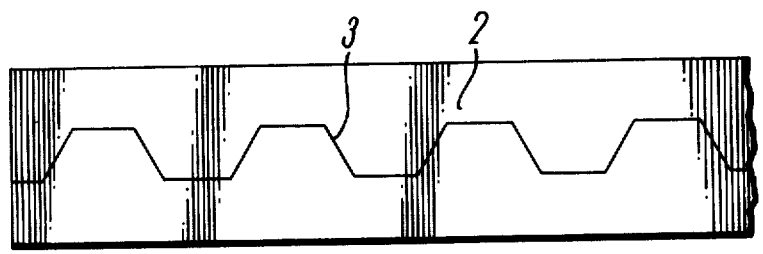
FIG. 2 is a top view of the endless band illustrating the line along which the band is cut in accordance with one embodiment of the invention.
Figure 3:
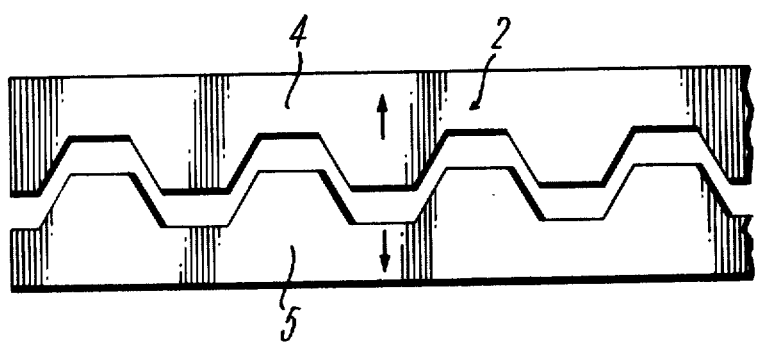
FIG. 3 illustrates the cut and separated band which has been cut along the line shown in FIG. 2.
Figure 4:
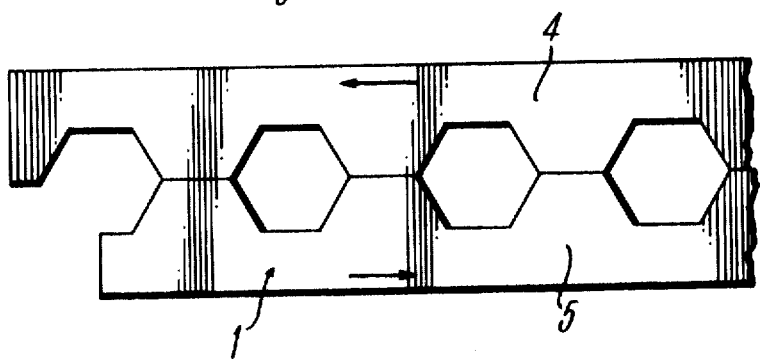
FIG. 4 is a top view of the metal band after the two pieces have been displaced with respect to one another and joined together.
Figure 5:
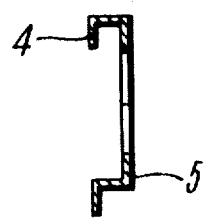
FIG. 5 is a cross-section of a girder in final form after having been cold rolled to the desired profile.

Referring now to the drawing, there is illustrated a preferred embodiment of the invention wherein the web portion 1 of the girder as seen in FIG. 4 is formed from a flat band of metal 2 which has been cut in a continuous process along a saw tooth or, a wave-formed or other undulating design along the line 3 as shown in FIG. 2. In the drawing, the undulating cut-line is formed in the shape of alternating trapezoidal peaks and valleys. As illustrated in FIG. 3, the metal sheet 2 is separated into two parts 4 and 5 as a result of the cutting step. The parts 4 and 5 are displaced with respect to one another as shown in FIG. 4 and in accordance with the procedures known in the art, and after alignment in the fashion shown in FIG. 4, the parts 4 and 5 are joined together by roll welding, spot welding, electrode welding, riveting or the like. The planar web having the configuration shown in FIG. 4 is then formed into the desired configuration by cold rolling. FIG. 5 illustrates the cross-section through an open-web girder which has been formed from a flat web into a selected profile by cold rolling. Obviously, the open-web girders of the present invention can be formed into cross-sectional configurations other than the one illustrated in the drawings.

What is claimed is:

1. A method for producing open-web girders which comprises joining first and second continuous bands of flat stock material having an undulating pattern along one edge thereof such that the high points of said first band join the corresponding high points of said second band and the low points of said first and second bands cooperate to form openings in the resulting planar web, and forming said planar web into a profile of a structural girder.

2. The method as defined by claim 1, further comprising the steps of forming said first and second continuous bands by cutting a single continuous band along an undulating cut-line and positioning said first and second bands for joining by displacing one of said bands laterally with respect to the other.

3. The method as defined by claim 1, further comprising the step of forming said first and second bands by cutting two separate continuous bands of stock material.

4. The method as defined by claim 1, wherein said undulating pattern is characterized by trapezoidal peaks and valleys.

5. The method as defined by claim 1, wherein said joining comprises welding said first and second bands together.

6. The method as defined by claim 1, wherein said joining comprises riveting said first and second bands together.

7. The method as defined by claim 1, wherein said planar web is profiled by cold rolling.

* * * * *